(12) United States Patent
Battilani

(10) Patent No.: US 7,025,582 B2
(45) Date of Patent: Apr. 11, 2006

(54) APPARATUS FOR PRESSURE MOLDING ARTICLES MADE OF PLASTICS, SUCH AS CAPS FOR CLOSING A CONTAINER AND THE LIKE

(75) Inventor: Mauro Battilani, Imola (IT)

(73) Assignee: Sacmi Cooperativa Meccanici Imola S.C.R.L., Imola (IT)

( * ) Notice: Subject to any disclaimer, the term of this patent is extended or adjusted under 35 U.S.C. 154(b) by 168 days.

(21) Appl. No.: 10/414,081

(22) Filed: Apr. 16, 2003

(65) Prior Publication Data

US 2003/0198707 A1    Oct. 23, 2003

(30) Foreign Application Priority Data

Apr. 23, 2002   (IT)   .......................... BO2002A0226

(51) Int. Cl.
*B29C 31/06*   (2006.01)

(52) U.S. Cl. ...................... 425/186; 425/219; 425/345; 425/349; 425/422

(58) Field of Classification Search ................ 425/182, 425/186, 219, 809, 344–345, 349, 422, 438, 425/453

See application file for complete search history.

(56) References Cited

U.S. PATENT DOCUMENTS

| 4,296,061 A | 10/1981 | Buckingham | |
|---|---|---|---|
| 4,943,405 A | 7/1990 | Keller et al. | |
| 5,807,592 A * | 9/1998 | Alieri | 425/347 |
| 6,007,315 A * | 12/1999 | Busacchi | 425/809 |
| 6,718,606 B1 * | 4/2004 | Bassi | 425/809 |

FOREIGN PATENT DOCUMENTS

GB        874084       8/1961

* cited by examiner

*Primary Examiner*—Joseph S. Del Sole
*Assistant Examiner*—Thu Khanh T. Nguyen
(74) *Attorney, Agent, or Firm*—Nixon & Vanderhye P.C.

(57) ABSTRACT

An apparatus for compression molding plastic articles, comprising at least one molding unit composed of an upper punch and a lower mold provided with a cavity for molding the articles, the punch and mold being aligned with each other and movable between a spaced position and a closer positions, feeders for feeding doses of plastic material to be molded, comprising at least one removal element for removing, in succession, individual doses from an extruder and depositing a removed dose in the molding cavity of the mold when it is spaced from the respective punch, supporting elements for temporarily supporting said dose above the molding cavity, associated with the mold, and actuators for actuating the supporting elements so as to release a dose into the cavity before compression start.

22 Claims, 7 Drawing Sheets

FIG. 2
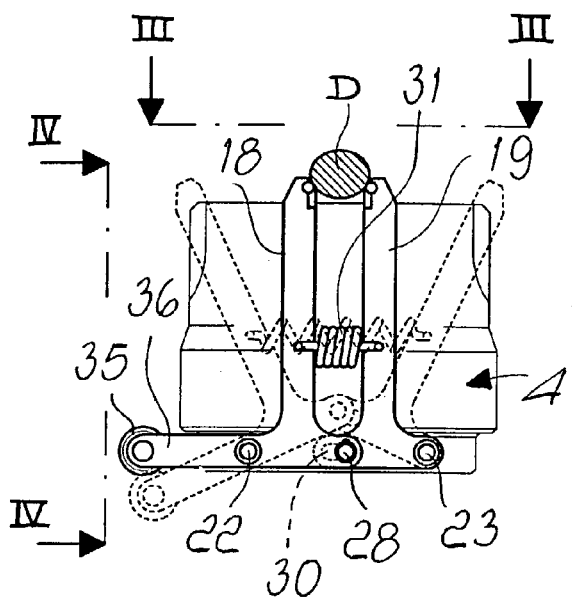
FIG. 4
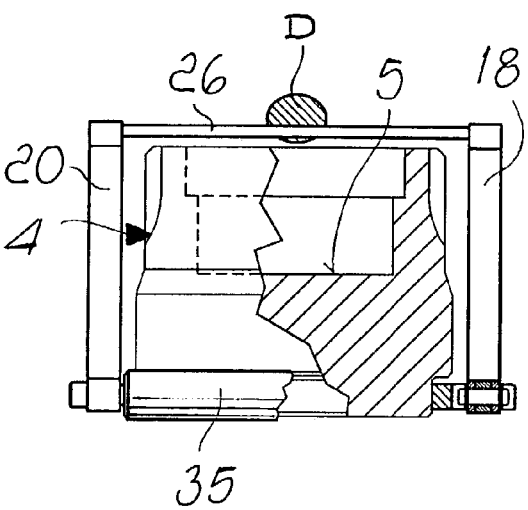
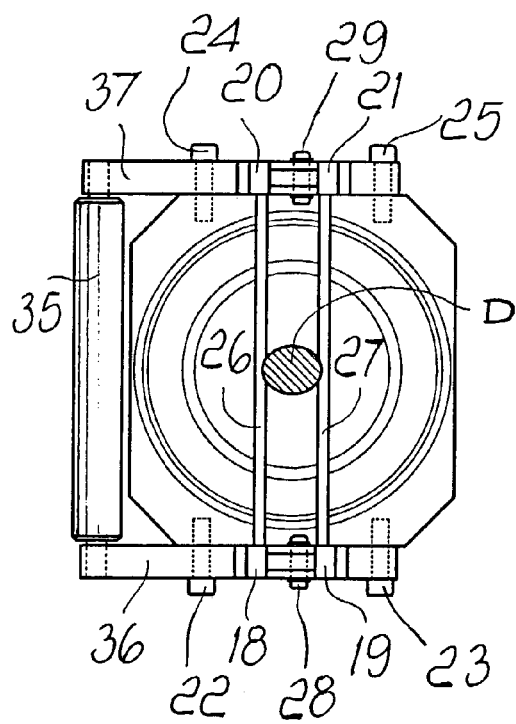
FIG. 3

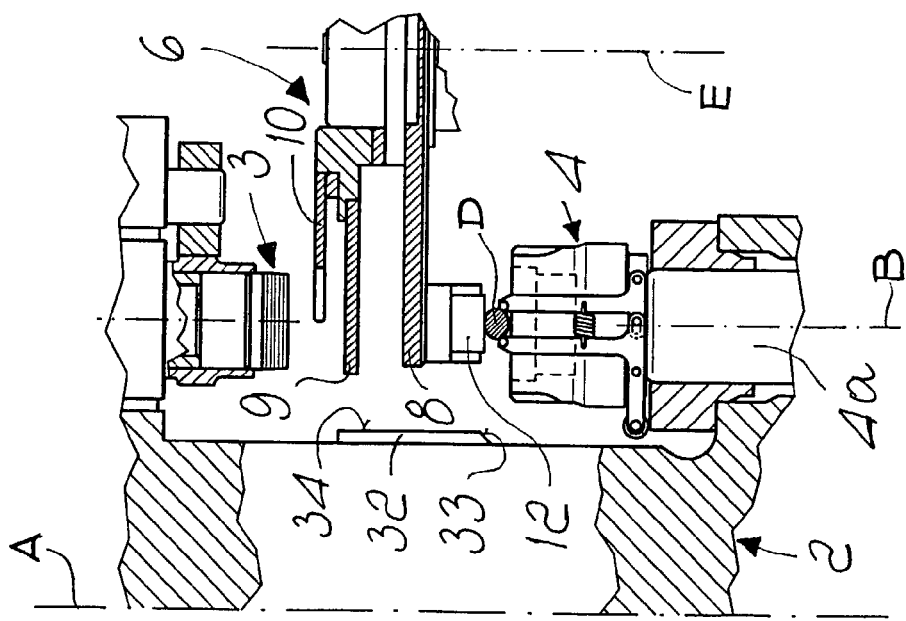
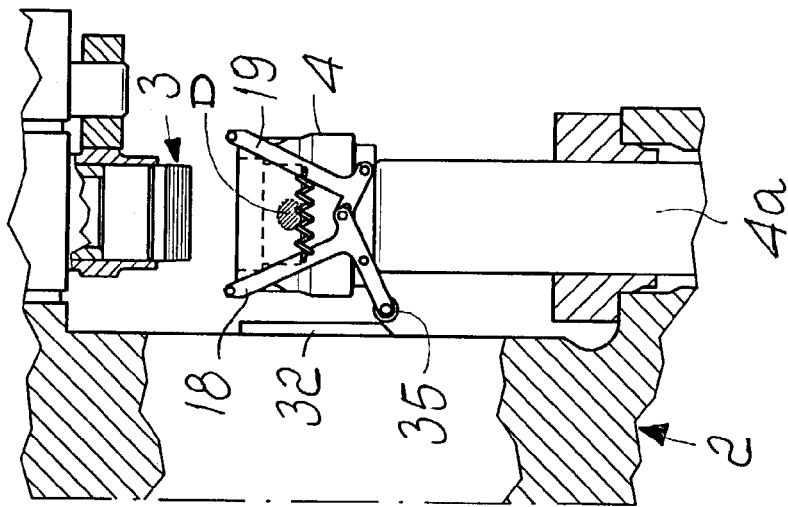
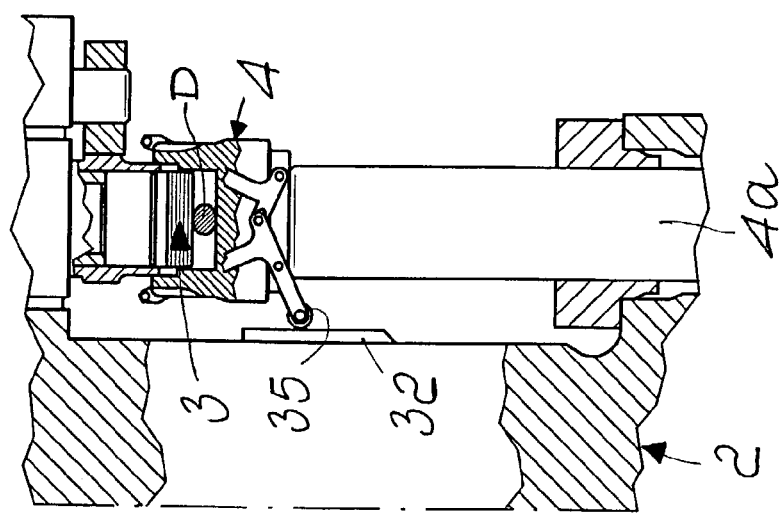

APPARATUS FOR PRESSURE MOLDING ARTICLES MADE OF PLASTICS, SUCH AS CAPS FOR CLOSING A CONTAINER AND THE LIKE

BACKGROUND OF THE INVENTION

The present invention relates to an apparatus for pressure molding articles made of plastics, such as caps for closing a container and the like.

U.S. Pat. No. 5,807,592 by the same Assignee discloses apparatuses of the indicated type for the pressure-molding of caps for closing a container, such as screw caps. Such apparatuses comprise a carousel that rotates about a vertical axis and on which a plurality of pressure-molding units are mounted concentrically around the rotation axis of the carousel and at an identical mutual angular distance. Each one of said units comprises an upper punch, which cooperates with a lower mold that is aligned with said punch and has a molding cavity.

By virtue of the rotation of the carousel, the molding units trace a circular path, which comprises a first sector, in which the necessary doses of plastic material to be molded are deposited in the cavities of the molds, a second sector, in which the article is molded, a third sector, in which the molded article is cooled, and a fourth sector, in which the molded article is extracted and conveyed away.

In these known apparatuses, the plastic material to be molded is removed from an extruder by means of a rotating head provided with a plurality of removal elements, which trace a circular path that has a point of tangency with the extrusion nozzle and with the circular path traced by the molding units. The rotating head and the carousel are mutually in step, in order to allow the removal elements to remove in succession doses of plastic material from the extruder and deposit them in the cavities of the molds.

The conventional apparatuses suffer the drawback that in the time that elapses between the moment when the doses are deposited in the cavities and the moment when said doses are compressed, the portion of the dose that is introduced in the cavity, by making contact with the colder surface of the cavity, undergoes cooling and therefore a variation in the degree of plasticity of the plastic material that is located at said portion, which causes, during molding, aesthetic defects that can be observed on the outer surface of the molded article. These defects, which become apparent mostly in the form of regions whose surface differs in terms of opacity from the surrounding regions and which sometimes have a certain surface porosity, constitute an unacceptable qualitative depreciation of the molded article.

Another drawback is the fact that the doses usually are not deposited at the center of the cavities of the molds, and therefore during the compression step the distribution of the plastic material does not expand uniformly, since it does not start from the center, causing molding problems due to the asymmetry of the filling.

Other drawbacks due to the deposition of the doses in the molding cavities can be observed in apparatuses (see U.S. Pat. No. 5,885,408) for forming plastic caps, on the bottom of which a label for decorative purposes or bearing information is to be incorporated externally. In these apparatuses, the labels are deposited inside the molding cavity before the doses, so that said doses, when they make contact with the label, due to their high temperature, cause deformations of the labels, particularly creases, which are unlikely to be smoothed out during the compression step.

SUMMARY OF THE INVENTION

The aim of the present invention is therefore to provide an apparatus which, associated with each molding unit of compression molding apparatuses, allows to obviate the drawbacks cited above.

Within this aim, an object of the present invention is to provide an apparatus that is highly flexible in use in relation to the ability to work with plastic material of various kinds and consistencies.

This aim and this object are achieved with an apparatus whose characteristics are defined in the appended claims.

BRIEF DESCRIPTION OF THE DRAWINGS

Further features and advantages of the present invention will become better apparent from the following description on the basis of the accompanying drawings, wherein:

FIG. 2 is a sectional view, taken along the radial line II—II of FIG. 1;

FIG. 3 is a sectional plan view, taken along the line III—III of FIG. 2;

FIG. 4 is a partially sectional view, taken along the tangential line IV—IV of FIG. 2;

FIGS. 5 to 10 are views of the apparatus in six successive operating positions;

DESCRIPTION OF THE PREFERRED EMBODIMENTS

Figure 1:
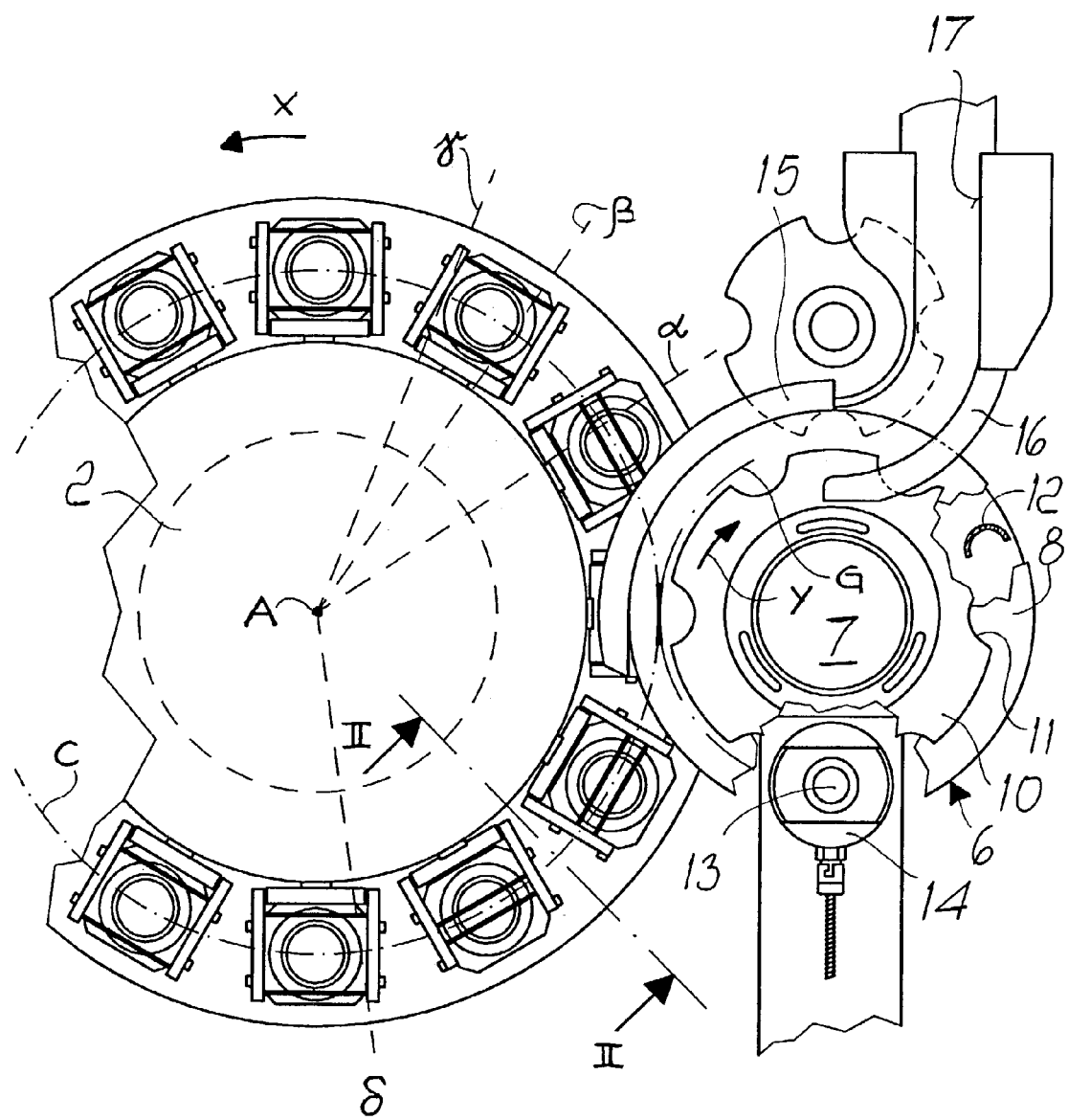
FIG. 1 is a schematic plan view of the apparatus according to a first embodiment.

With reference to FIGS. 1 to 5, the apparatus comprises a carousel, generally designated by the reference numeral 1, which is rotationally actuated in the direction X about a vertical axis. The carousel comprises a supporting element 2, termed drum hereinafter, on which a plurality of molding units are mounted (see FIG. 5); each molding unit comprises an upper punch 3, which is substantially stationary with respect to the drum 2, and a lower mold 4, which can move along an axis B for alignment with the punch 3.

The molding units are distributed at an identical radial and angular distance around the axis A, and therefore their axes B trace a circular path C (see FIG. 1).

Each mold 4 has a cavity 5 (see FIG. 4), which is open upward and in which a dose D of plastic material is molded; said dose is introduced therein in the pasty state and is fed by a rotating head 6, which can rotate in the direction Y about an axis E that is parallel to the axis A.

The mold 4 is mounted at the top of a vertical stem 4a, which is guided in a seat of the drum 2 and is actuated by a hydraulic jack (not shown), which can be connected, by way of suitable valve systems, to a source of pressurized fluid. When the pressurized fluid pushes the stem 4a upward, the mold 4, in an appropriate region of the path C of the carousel, compresses the dose D of plastic material against the punch 3, performing, along a subsequent arc of the path C, the molding of the article, which in the described case is a cap-type closure F.

Said rotating head 6 is shown only schematically in the accompanying drawings, since it is not relevant to the inventive concept of the present invention. In any case, it can be understood more clearly from the aforesaid U.S. Pat. No. 5,807,592.

As shown in FIGS. 1 and 5, the rotating head 6 is composed of a shaft 7, which rotates about the axis E and to the top of which a flange 8 is rigidly coupled; a plate 9 is fixed on top of the flange 8, and a disk 10 is also fixed thereto above the plate and is provided with recesses 11 that give the disk a star-like appearance.

A plurality of elements 12 for removing the doses of plastic material are fixed to the downward face of the flange 8 and are distributed around the axis E at an equal circumferential distance that is equal to the one by which the molds 4 are spaced around the axis A. Each removal element 12 comprises a sort of cup, which has a concave portion orientated in the rotation direction Y. The lower edge of the cups 12 is co-planar to the outlet of a nozzle 13 of an extruder 14, whose opening is directed upward so that during the rotation of the head 6 each cup 12 can remove from the nozzle a dose D of plastic material that corresponds to the dose that exits from the nozzle in the time that elapses between the passage of two successive cups in front of said nozzle.

The cups 12 trace a path G that is tangent to the path C traced by the molds 4, and the angular velocities of the carousel 1 and of the rotating head 6 are linked so that at the point of tangency of the paths C and G each cup 12 is substantially aligned with a respective mold 4. The transfer of the dose D from the cups 12 into the cavities 5 of the molds can be performed as described in the aforesaid U.S. Pat. No. 5,807,592 by virtue of the action of a jet of compressed air that is directed downward, possibly combined with a mechanical action obtained by providing, in each cup, an expulsion piston that can move vertically and is actuated by compressed air by way of valve means.

The recesses 11 of the star 10 are shaped so as to receive and retain on the upper face of the plate 9 the molded caps F, which after the cooling step are diverted in succession so as to leave the carousel. The caps F that engage the recesses 11 are conveyed between two guides 15 and 16, which are arranged at the level of the plate 9, so as to form a channel 17 for removing the caps.

As explained initially, with carousels for compression molding of the type described above, the dose D of plastic material, after being removed by the cups 12 and introduced in the cavities 5, remains in contact with the internal surface of the cavity for some time before the compression step begins. During this time, the portion of the dose D that is in contact with the internal surface of the cavity 5 undergoes a cooling that alters its consistency, so that during the molding step the plastic material flows unevenly, causing defects that are visible in particular on the outer surface of the bottom of the cap.

In order to obviate this drawback, a device is associated with each mold 4 and supports with minimal contact and temporarily the dose D to be introduced in the corresponding cavity, so as to allow the punch to approach it before the actual molding step is started.

As shown by FIGS. 2 to 4, said device is composed of two pairs of levers 18, 19 and 20,21, which are pivoted on diametrically opposite sides of the mold 4 by means of threaded pivots 22, 23 and 24, 25, which are screwed into the base of the mold so as to allow the oscillation of the levers on parallel planes that are substantially radial with respect to the rotation axis A of the carousel.

The levers 18–21 extend upward so that their tops protrude above the edge of the cavity 5. The tops of the levers 18, 19 are connected to the tops of the respective levers 20, 21 by means of two mutually parallel rods 26, 27 that are diametrical above the cavity 5. The levers 18 and 20 are articulately connected to the levers 19 and 21, respectively, by means of pins 28 and 29. In order to allow the play that is necessary for the levers 18–21 to be able to oscillate about the pivots 22–25, the pins 28 and 29 are driven through arms that protrude from the lower ends of the levers 18 and 20 and engage in elongated slots 30 (see FIG. 2) of arms that are coupled in a mirror-symmetrical fashion to the lower ends of the levers 19 and 21.

The levers 18–21 of each pair are actuated toward each other by virtue of traction springs 31 (see FIG. 2) which, along an angular portion of the path of the carousel 1, retain them in a position in which the rods, above their respective cavities, are adjacent at a mutual distance that allows to momentarily support a dose D of plastic material deposited between them by a cup 12, as will become better apparent hereinafter.

The movement of the pairs of levers 18–21 associated with each mold 4 is controlled by a cam 32 that is fixed to the drum 2.

Each cam 32 has a profile that is composed of a ramp 33, which continues upward with a straight portion 34 that is parallel to the axis A. A cam follower cooperates with each cam 32 and is constituted by a roller 35 that is supported rotatably by two arms 36 and 37 that protrude at right angles from the respective levers 18 and 20 toward the axis A.

The operation of the described apparatus is described hereinafter by following what happens in a molding unit during the 360° rotation of the carousel 1.

By virtue of the rotation of the head 6, the cups 12 remove in succession doses of plastic material from the outlet of the nozzle 13. The consistency of the plastic material at the outlet of the nozzle 13 is such as to allow the dose to adhere to the wall of the cups 12.

When a cup 12 of a molding unit, after removing a dose D from the nozzle 13 of the extruder 14, is located at the point of tangency between its path G and the path C of the molds 4, the dose D is propelled downward and collected on the rods 26 and 27, which in this step in which the mold 4 has not yet started its lifting stroke are close one another (see FIG. 5).

In the angular position a, the lifting of the mold 4 begins. However, the rods 26 and 27 still remain mutually adjacent until, after reaching the angular position β, the mold 4 has reached the level at which the roller 35 abuts against the ramp 33 of the cam 32, causing the divarication of the rods (see FIG. 6) and making the dose D fall into the cavity 5. As shown in FIG. 6, the rods 26, 27 open in the cavity 5 when the mold 4 is close to the punch 3. The compression of the dose D is completed (see FIGS. 7 and 8) by virtue of the subsequent rotation of the molding unit to the angular position γ.

Figure 8:
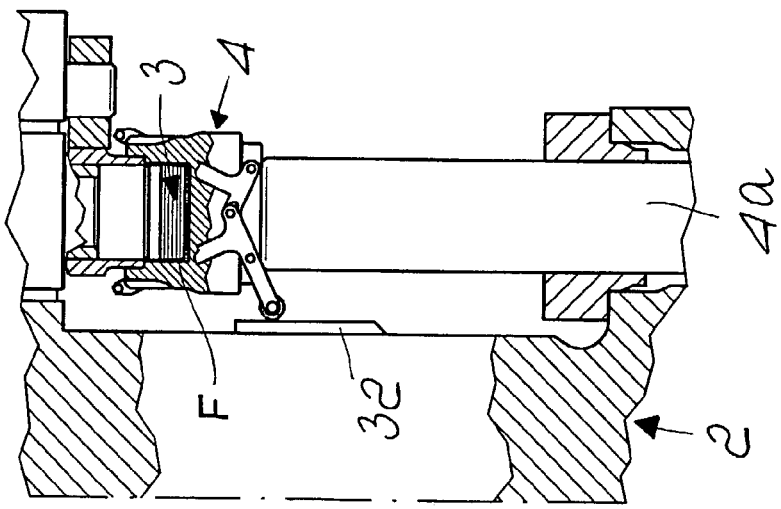
Figure 13:
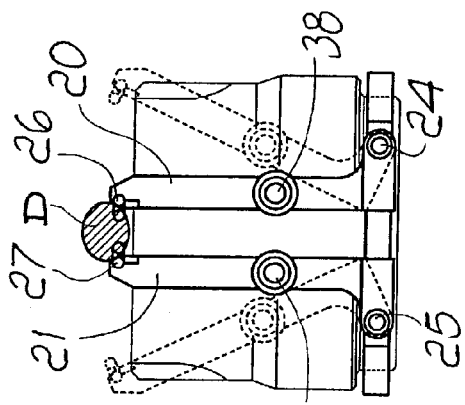
FIG. 13 is a radial view, taken along the line XIII—XIII of FIG. 12.
Figure 12:
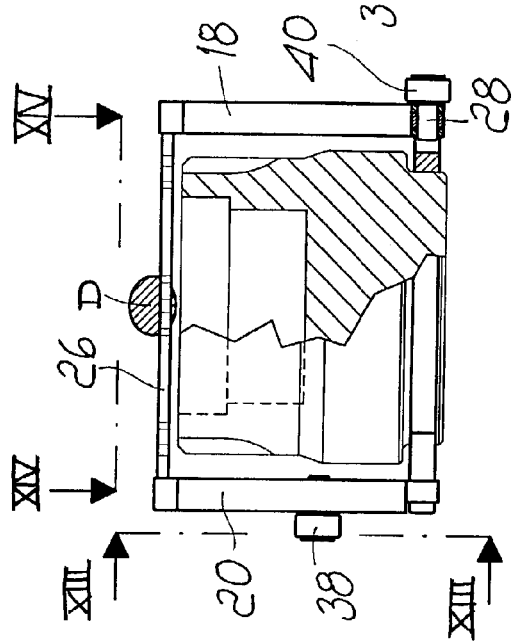
FIG. 12 is a partially sectional and tangential view taken along the line XII—XII of FIG. 11.
Figure 14:
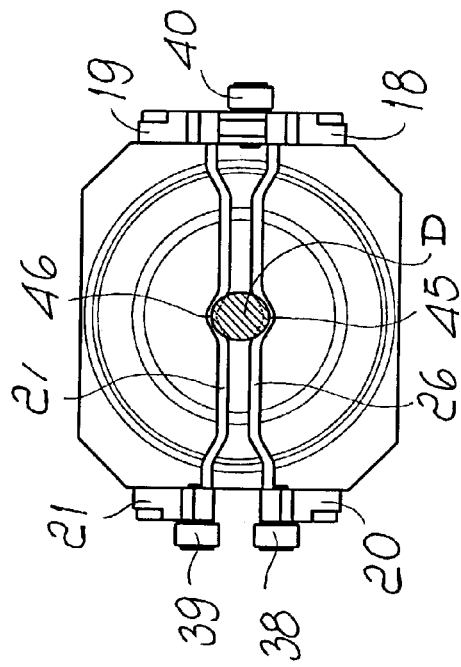
FIG. 14 is a plan view, taken along the line XIV—XIV of FIG. 12.
Figure 11:
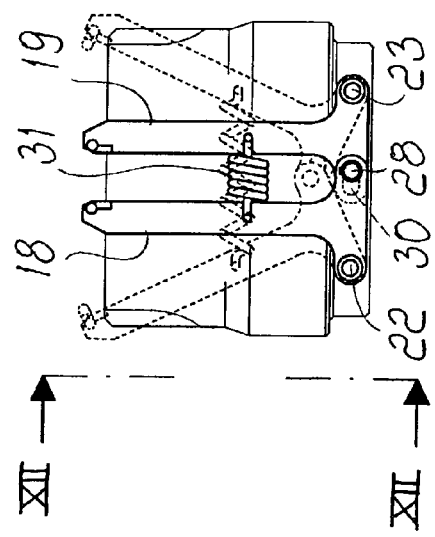
FIG. 11 is a view of a first variation, taken along a radial direction.

As shown in FIG. 8, throughout the step for molding and stabilizing the cap (which continues until the corresponding molding unit has reached the angular position δ), the rods 26, 27 remain spaced due to the engagement of the roller 32 on the straight portion 34 of the cam 32.

Once the angular position δ has been reached, the descent of the mold 4 begins; when the roller 35 has descended below the ramp 33, said descent allows the rods 26 and 27, due to the action of the springs 31, to move adjacent one another again above the cavity 5, and be ready to receive a new dose D.

Figure 10:
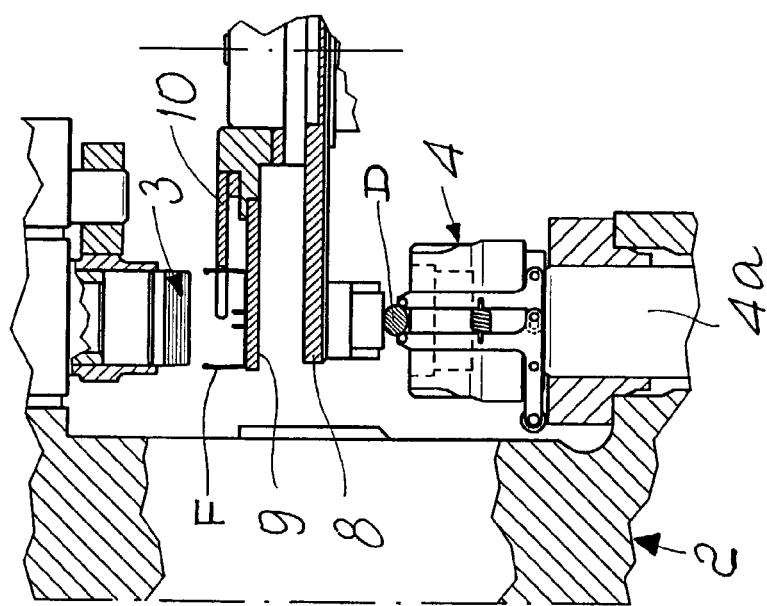
Figure 9:
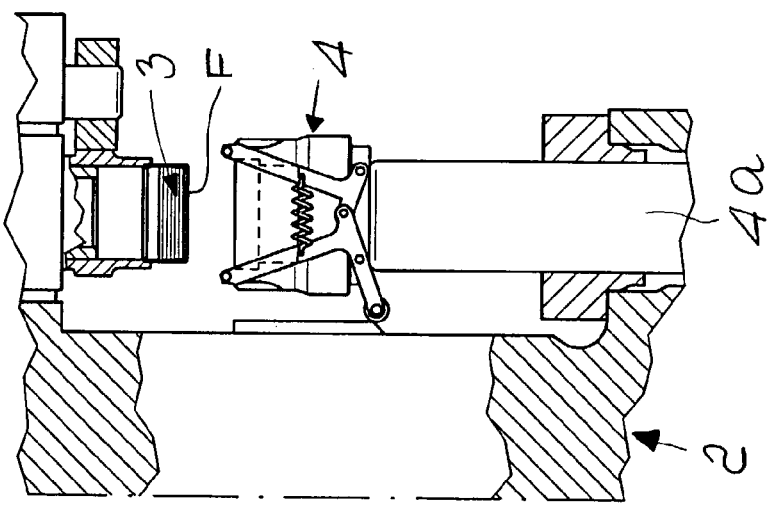

As shown in FIG. 9, the molded cap F remains attached to the punch and, after being deposited on the plate 9 of the head 6, is collected by the recesses 11 of the star conveyor 10 (see FIG. 10) and conveyed along the channel 17 toward the removal means.

The described apparatus therefore achieves the intended aim and object. In fact, according to a fundamental aspect of the invention, the time that elapses between the deposition of the dose D in the cavity 5 and the beginning of the deformation of the plastic material is practically reduced to zero. In this manner, the dose D remains in localized contact with the inner surface of the cavity 5 for a time that is insufficient to cause significant changes in the consistency of the plastic material. Therefore, the temperature of the plastic material of the deposited dose remains substantially constant in every point, so as to ensure uniform plastic deformation during compression.

The fact that the deposition of the dose and the beginning of the compression are substantially simultaneous also offers the advantage that in the case of caps provided with an incorporated label, the time for which the doses remain on the labels, which are introduced beforehand in the molding cavities, is insufficient to cause deformations of the label. Therefore, the labels remain always perfectly flat and are smoothed out once compression is complete.

One highly advantageous aspect of the invention is the fact that the speed of the mold 4 is usually such as to cause the separation of the dose D from the rods 26 and 27. In particular, the dose D is propelled against the punch with such an impact forces that it adheres to said punch. Therefore, the region of the dose that makes contact with the punch and may form defects, actually, during the compression step, remain inside the cap, so that any defects, once molding has been completed, also remain inside the cap, and do not endanger the aesthetics of the product because they are not visible externally.

The described apparatus is susceptible of numerous modifications and variations, all of which are within the scope of the same inventive concept.

Figure 15:
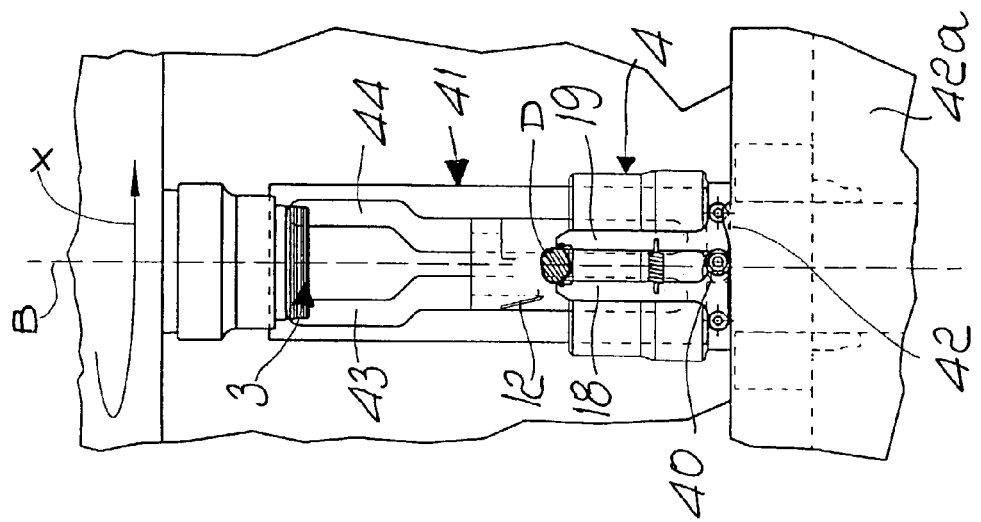
FIGS. 15 to 17 are views of the apparatus according to the variation in three successive operating positions.
Figure 16:
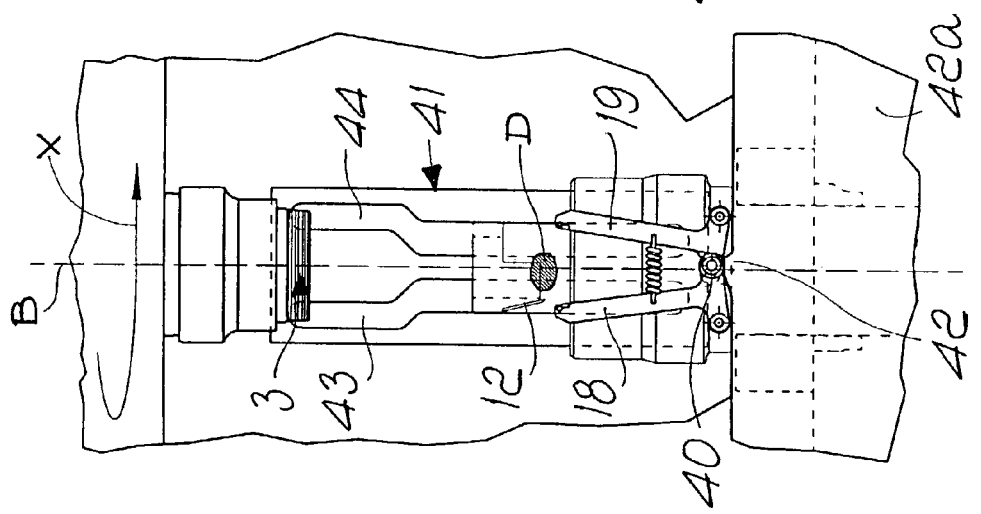
Figure 17:
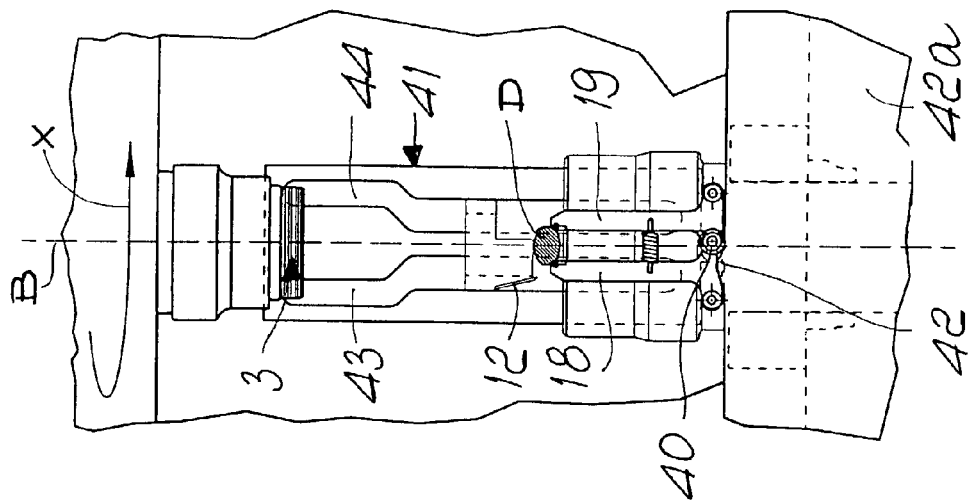

FIGS. 11 to 14 illustrate a solution which, as shown more clearly in FIGS. 15 to 17, orientates the rods 26 and 27 radially with respect to the rotation axis A of the carousel.

Differently from the previously described solution, the levers 20 and 21 support two respective free rollers 38 and 39, which are mounted in a cantilevered fashion approximately halfway along their length, while the pin 28, which articulates to each other the levers 18 and 19, supports a roller 40 that protrudes outward.

The levers 18–21 are actuated by an internal cam 41, which is coupled to the cylindrical part of the rotating drum 2, and by an external cam 42 (see FIGS. 15 to 17), which is constituted by a bulge that protrudes from an element 42a that is stationary with respect to the carousel 1.

The internal cam 41 comprises two slots 43 and 44, and a respective roller 38 and 39 engages in each of said slots and acts as a cam follower.

Each one of the slots 43 and 44 comprises two parallel and vertical portions, which are connected by an inclined intermediate portion. The upper portions of the slots are further apart than the lower portions. In this manner, when the molds are lifted, the rollers 38 and 39, by following the slots 43 and 44, cause the divarication of the levers 18–21 and the spacing of the rods 26 and 27.

The cam 42 is arranged at the point of tangency between the paths C and G, and during the rotation of the carousel 1 raises in succession the rollers 40, causing a rapid mutual spacing and approach of the rods 26 and 27.

Conveniently, the rods are provided centrally with curved portions 45 and 46 (see FIG. 14), which form a seat that is adapted to receive a dose D of plastic material deposited therein by a cup 12.

The activation of the levers 18–21 by the cam 42 precedes the activation performed by the cam 41. The operating sequence can be deduced from FIGS. 15 to 17. In particular, after a dose D has been removed by a cup 12 and deposited on the curved portions 45 and 46 of the rods 26 and 27 of a respective mold 4 (see FIG. 15), the roller 40, by surmounting the cam 42, causes the rods 45 and 46 to perform a rapid movement to open (see FIGS. 15 and 16) and close (see FIG. 17), which allows the dose not to fall into the cavity 5 of the mold 4 and instead continue to be retained in the seat formed by the curved portions 45 and 46. The opening and closing movement of the rods 26 and 27 can be synchronized with the stroke of the mold 4, so as to catch the dose D released into the cavity 5.

The steps for molding the cap F follow one another in the manner described in the preceding example, taking into account the fact that the opening and closing movement of the rods, due to their radial arrangement, occurs in a tangential direction.

Figure 18:
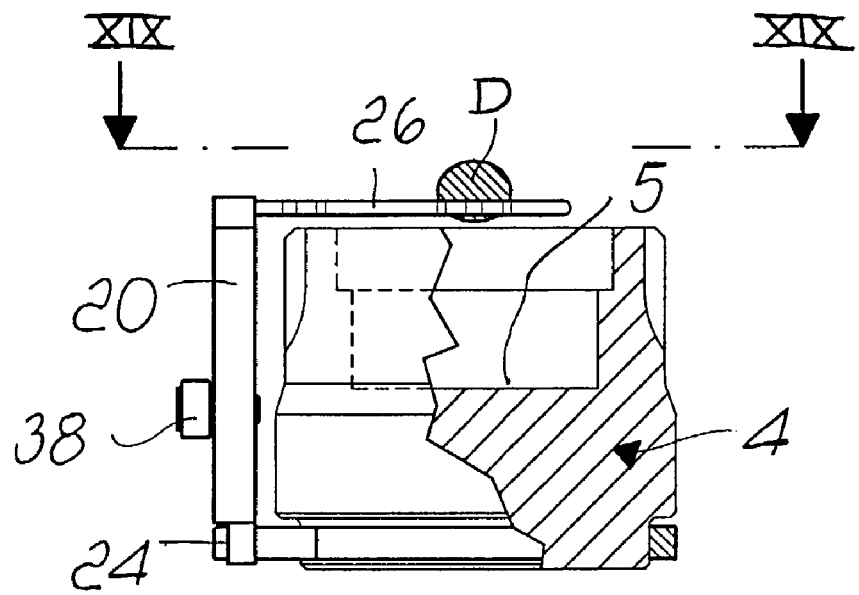
FIG. 18 is a tangential sectional view of a second variation which is similar to the variation of FIG. 12; and finally
Figure 19:
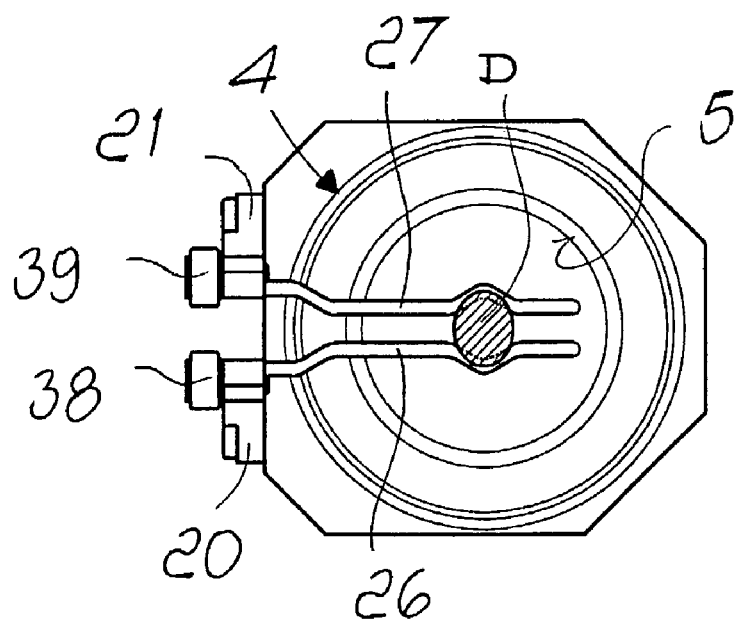
FIG. 19 is a sectional plan view of the variation of FIG. 18, taken along the line XIX—XIX.

Another variation of the apparatus is shown in FIGS. 18 and 19. Said solution is a constructive simplification with respect to the solution of FIGS. 11 to 14 owing to the absence of the external levers 18 and 19, so that the rods 26 and 27 are fixed in a cantilevered fashion only to the internal levers 20 and 21, forming a sort of fork.

Further variations provide for the thermal conditioning of the rods by means of resistor-type plugs, by induction or by means of a jet of air.

The disclosures in Italian Patent Application No. BO2002A000226 from which this application claims priority are incorporated herein by reference.

What is claimed is:

1. An apparatus for compression molding plastic articles, comprising:
    a molding unit comprising an upper punch and a lower mold provided with a cavity for molding said articles, said punch and said lower mold being mutually aligned and movable between a spaced position and a close position;
    feeding means for feeding doses of plastic material to be molded, said feeding means comprising at least one removal element for removing in succession individual doses from an extruder;
    supporting means for receiving a dose from said at least one removal element and temporarily supporting said dose when said lower mold is still spaced away from said punch; and
    actuating means for actuating said supporting means so as to release said dose into said cavity before said punch and said lower mold start a compression step,
    wherein said supporting means is mounted so that it extends externally to, and partially above, an upper edge of said lower mold.

2. An apparatus according to claim 1, further comprising a rotating carousel comprising a supporting element that rotates about an axis, one or more units corresponding to said molding unit being mounted on said supporting element concentrically to said axis, further actuating means being provided for actuating said supporting element so that said molding unit advances along a circular path passing through a position in which said feeding means is provided.

3. An apparatus according to claim 2, wherein said supporting means comprises a lever system, which supports a pair of rods, each rod of said pair of rods lying substantially diametrically above said cavity.

4. An apparatus according to claim 3, wherein said lever system comprises a pair of levers pivoted to said mold, each lever of said pair of levers being rigidly coupled to one end of a respective rod of said pair of rods and actuated by said actuating means.

5. An apparatus according to claim 4, wherein said lever system comprises a further pair of levers which are pivoted to said mold in a substantially diametrically opposite position relative to said pair of levers, each further lever of said further pair of levers being rigidly coupled to another end of said respective rod.

6. An apparatus according to claim 5, wherein the levers of said pair of levers and said further pair of levers are articulately connected to each other.

7. An apparatus according to claim 5, wherein the levers of said pair of levers and said further pair of levers are arranged so as to oscillate in respective planes which are substantially radially arranged with respect to said axis.

8. An apparatus according to claim 5, further comprising a traction spring, which acts between the levers of said pair of levers and of said further pair of levers.

9. An apparatus according to claim 3, wherein said rods lie substantially radially with respect to said axis.

10. An apparatus according to claim 5, wherein said actuating means comprises cam means by which said supporting means can be actuated between a closer configuration for supporting said dose and a spaced configuration for releasing said dose into said molding unit.

11. An apparatus according to claim 10, wherein at least one of the levers of said pair of levers and of said further pair of levers is provided with a cam follower interacting with a respective cam of said cam means.

12. An apparatus according to claim 11, wherein said cam is fixed to said supporting element and is active when said mold is moved towards and away from said punch.

13. An apparatus according to claim 12, wherein said cam is provided with a ramp and a straight portion parallel to said axis.

14. An apparatus according to claim 11, wherein said cam follower comprises a roller that is freely supported by arms that are rigidly coupled to corresponding levers of said pair of levers and of said further pair of levers.

15. An apparatus according to claim 10, wherein said cam means comprises two slots, suitable for engaging two rollers fixed to a portion of the levers of said pair of levers facing said axis.

16. An apparatus according to claim 15, wherein said two slots comprise two parallel, vertical and spaced portions connected to two parallel, vertical and close portions by means of respective inclined portions.

17. An apparatus according to claim 15, wherein said cam means comprises a stationary cam provided with a bulge protruding from an upward surface of said supporting element.

18. An apparatus according to claim 17, wherein said stationary cam engages a further roller supported by a pivot at which the levers of said pair of levers and of said further pair of levers are mutually articulated, said further roller being arranged at a side of said mold opposite to said axis, in order to actuate said rods so as to perform a movement for gripping said dose.

19. An apparatus according to claim 3, wherein said rods are centrally provided with respective curved portions forming a seat suitable for receiving said dose.

20. An apparatus according to claim 2, and further comprising means for thermally conditioning said supporting means.

21. An apparatus for compression molding plastic articles, comprising:

a molding unit comprising an upper punch and a lower mold provided with a cavity for molding said articles, said punch and said lower mold being mutually aligned and movable between a spaced position and a close position;

a feeding unit that feeds doses of plastic material to be molded, said feeding unit comprising at least one removal element for removing in succession individual doses from an extruder;

a support mounted so that it extends externally to, and partially above, an upper edge of said lower mold, said support receiving a dose from said at least one removal element and temporarily supporting said dose when said lower mold is still spaced away from said punch; and an actuator that actuates said support so as to release said dose into said cavity before said punch and said lower mold start a compression step.

22. An apparatus for compression molding plastic articles, comprising:

a molding unit comprising an upper punch and a lower mold provided with a cavity for molding said articles, said punch and said lower mold being mutually aligned and movable between a spaced position and a close position;

a feeding unit that feeds doses of plastic material to be molded, said feeding unit comprising at least one removal element for removing in succession individual doses from an extruder;

a support mounted so that it extends externally to, and partially above, an upper edge of said lower mold, said support receiving a dose from said at least one removal element and temporarily supporting said dose when said lower mold is still spaced away from said punch, wherein said support comprises a lever system that supports a pair of rods, each rod of the pair of rods lying substantially diametrically above said cavity; and an actuator that actuates said support so as to release said dose into said cavity before said punch and said lower mold start a compression step.

* * * * *